(12) United States Patent
Shapery

(10) Patent No.: US 8,069,792 B2
(45) Date of Patent: Dec. 6, 2011

(54) SYSTEM AND METHOD FOR CAPTURING ENERGY FROM A RAILCAR

(76) Inventor: Sandor Wayne Shapery, San Diego, CA (US)

(*) Notice: Subject to any disclaimer, the term of this patent is extended or adjusted under 35 U.S.C. 154(b) by 475 days.

(21) Appl. No.: 12/184,524

(22) Filed: Aug. 1, 2008

(65) Prior Publication Data
US 2009/0032350 A1 Feb. 5, 2009

Related U.S. Application Data

(60) Provisional application No. 60/953,404, filed on Aug. 1, 2007.

(51) Int. Cl.
*B60L 13/00* (2006.01)
*B60M 1/30* (2006.01)
(52) U.S. Cl. ...................... 104/287; 191/22 R
(58) Field of Classification Search .................. 104/287, 104/289, 291, 292; 191/22 R, 29 R, 29 DM, 191/33 R, 35, 36, 22 C
See application file for complete search history.

(56) References Cited

U.S. PATENT DOCUMENTS

| | | | |
|---|---|---|---|
| 3,569,804 A | 3/1971 | Studer | |
| 3,594,622 A | 7/1971 | Inagaki | |
| 3,641,939 A * | 2/1972 | Remy | 104/293 |
| 3,694,041 A | 9/1972 | Studer | |
| 3,706,922 A | 12/1972 | Inagaki | |
| 3,797,402 A | 3/1974 | Karch | |
| 3,845,720 A | 11/1974 | Bohn | |
| 3,847,089 A * | 11/1974 | Nelson | 104/291 |
| 3,911,828 A | 10/1975 | Schwarzler | |
| 4,092,554 A * | 5/1978 | Quinn | 104/292 |
| 4,315,197 A | 2/1982 | Studer | |
| 4,324,185 A | 4/1982 | Vinson | |
| 5,009,865 A | 4/1991 | Boden | |
| 5,757,098 A | 5/1998 | Higuchi | |
| 5,923,109 A | 7/1999 | Higuchi | |
| 5,959,382 A | 9/1999 | Dauwalter | |
| 6,268,673 B1 | 7/2001 | Shah et al. | |
| 6,396,178 B1 | 5/2002 | Chiu | |
| 6,612,245 B2 * | 9/2003 | Kumar et al. | 105/26.05 |
| 6,977,451 B2 | 12/2005 | Onishi | |
| 2006/0113848 A1 | 6/2006 | Studer | |
| 2008/0223249 A1 | 9/2008 | Studer | |

* cited by examiner

*Primary Examiner* — Joe Morano, IV
*Assistant Examiner* — R. J. McCarry, Jr.
(74) *Attorney, Agent, or Firm* — Knobbe, Martens, Olson & Bear LLP

(57) ABSTRACT

A method and system of using one or more railcar linear electric generators to decelerate a vehicle such as a train consist. In one embodiment, the one of more electric generators are configured to capture deceleration energy and supply the energy to one or more power grid connections. The one of more railcar electric generators may also operate as motors to assist propelling a train consist. Optional energy storage may also be included.

8 Claims, 3 Drawing Sheets

SYSTEM AND METHOD FOR CAPTURING ENERGY FROM A RAILCAR

CROSS-REFERENCE TO RELATED APPLICATIONS

This application claims priority under 35 U.S.C. §119(e) from U.S. Provisional Application No. 60/953,404 filed Aug. 1, 2007, which is hereby incorporated by reference in its entirety.

BACKGROUND

1. Field

The present invention relates to applications of linear motors, and in particular to capturing energy from a rail car using a linear motor.

2. Description of the Related Art

To maintain a safe downhill speed, railroad freight trains dissipate significant amounts of energy as brake wear and heat. Freight trains are typically over 100 cars long with four locomotives and weigh over 15 million pounds. Thus a need exists to harness this dissipated energy.

SUMMARY OF CERTAIN INVENTIVE ASPECTS

The system, method, and devices of the invention each have several aspects, no single one of which is solely responsible for its desirable attributes. Without limiting the scope of this invention as expressed by the claims which follow, its more prominent features will now be discussed briefly. After considering this discussion, and particularly after reading the section entitled "Detailed Description of Certain Embodiments" one will understand how the features of this invention provide advantages that include improved and efficient braking on grades and generation of usable electrical power.

One aspect of the invention is a system for generating electric power, the system comprising a source of magnetic flux configured to induce a magnetic field in a first conductor; and a second conductor positioned substantially stationary relative to the source of magnetic flux, and configured to carry an electric current generated in response to a relative motion of the first and second conductors.

Another aspect of the invention is a method of configuring a rail system to generate electrical power, comprising positioning a source of magnetic flux so as to induce a magnetic field in a first conductor, positioning a second conductor substantially stationary relative to the source of magnetic flux, so as to generate an electric current in response to a relative motion of the first and second conductors, and electrically coupling the second conductor to a power line of an electric power transmission system so as to supply energy to the power transmission system during the downhill travel of a rail car.

Another aspect of the invention is an apparatus attached to a rail car, the apparatus comprising a source of magnetic flux configured to induce a magnetic field in a first conductor, a second conductor, and a mount configured to attach the source of magnetic flux and the second conductor to the rail car, wherein the second conductor is configured to, as the rail car traverses the rail, carry an electric current generated in response to relative motion of conductive element positioned and the coil.

Yet another aspect of the invention is an apparatus attached to a rail car, the apparatus comprising a first conductor, and a mount configured to attach the first conductor to the rail car, wherein the first conductor is configured to, as the rail car traverses the rail, have a magnetic field induced therein, and to generate an electric current in a second conductor by moving relative to the second conductor.

DETAILED DESCRIPTION OF THE CERTAIN EMBODIMENTS

The following detailed description is directed to certain specific embodiments of the invention. However, the invention can be embodied in a multitude of different ways as defined and covered by the claims. In this description, reference is made to the drawings wherein like parts are designated with like numerals throughout.

To maintain a safe downhill speed, railroad freight trains dissipate significant amounts of energy as brake wear and heat. Freight trains are typically over 100 cars long with four locomotives and weigh over 15 million pounds. The decrease in elevation of this weight forms the basis of an energy source much like water behind a dam turning a turbine generator yields hydroelectric power. The capture and recycling of this braking energy is a clean and somewhat renewable source of power depending on the frequency of trains descending from the summit of railroad passes.

Accordingly, an aspect of the invention comprises a system to capture freight train braking energy. A railcar may be defined as a flange-wheeled vehicle in which the wheels roll on and are guided by rails on a roadbed also known as a railroad track. As used herein, "passive railcar" refers to railcar primarily propelled (e.g., pulled, pushed) by an external driving force. A passive railcar has no primary power unit for the conversion of chemical fuel into electric or kinetic energy used to propel the vehicle. In contrast, an "active railcar" is primarily propelled by either an internal driving force or by converting external power into a motive force via appropriate mechanics and/or circuitry. An example of an active railcar is a locomotive, a railcar that provides the motive power for the train, including one or more passive railcars attached to the locomotive. Active railcars may have any of a number of mechanisms for generating a motive force, including a steam engine, an internal combustion engine, an electric motor, or a hybrid motor.

A linear induction or linear synchronous electric motor may be used to maintain a safe downhill speed of a train while generating power by converting the potential energy of the train into electrical power. In effect, a current is generated by the relative motion of a magnetic flux passing through armature coils of wire similar to the working principles of any electric motor. As will be described below, in one embodiment of the invention, a changing magnetic field induced into a passive conductor causes the flux change and the magnetic force resistance between the armature coils and the passive conductor. Thus, a magnetic force slows the train while generating a current in the armature windings.

Figure 1:
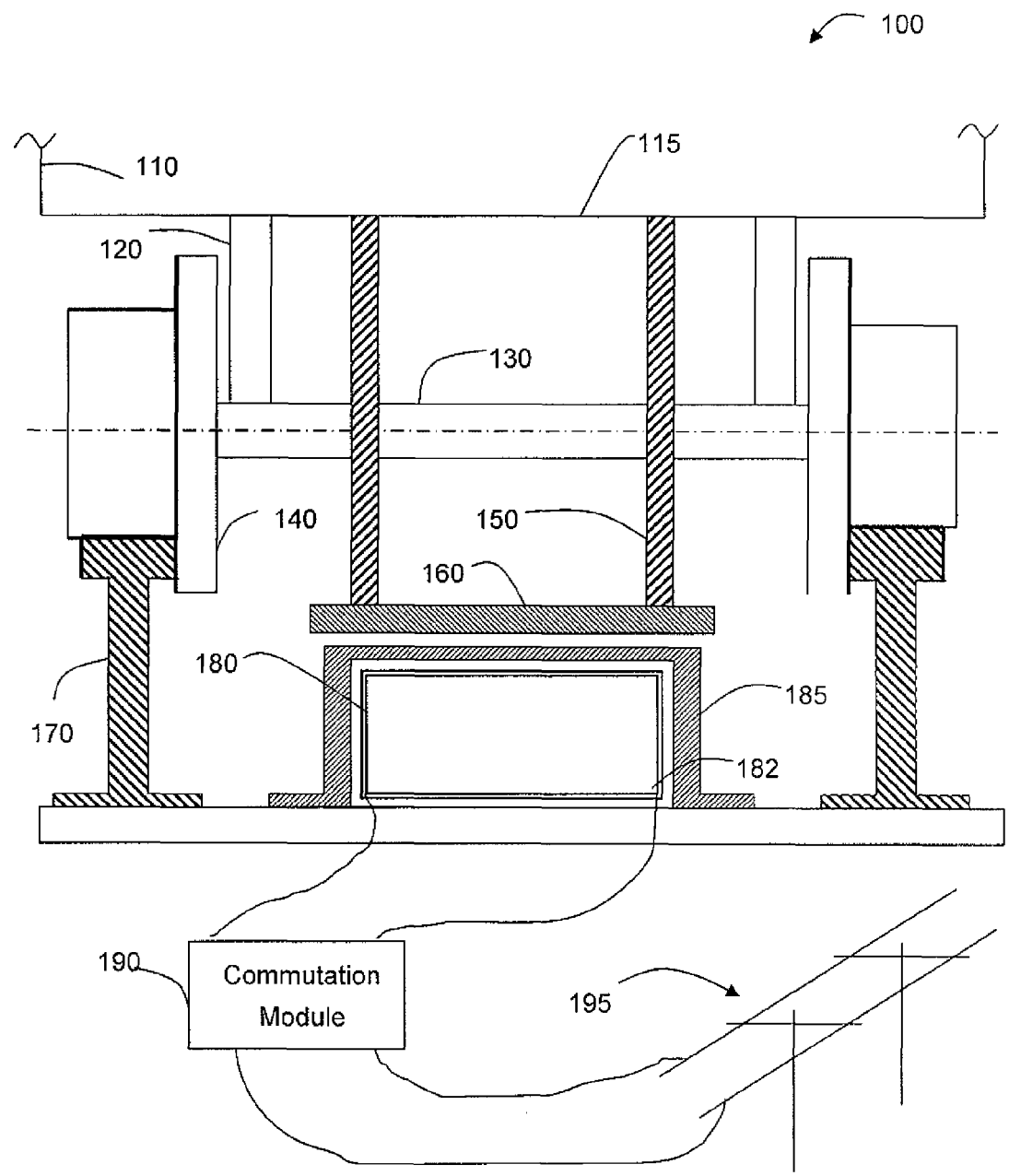
FIG. 1 is an illustration depicting one embodiment of a braking regeneration system for a passive railcar.

FIG. 1 illustrates one embodiment of a linear motor braking regeneration energy capture and supply system 100 comprises a passive railcar 110 riding along a set of rails 170. Two wheels 140 connect via an axle 130 to form a wheelset, which is connected to the body 115 of the railcar 110 by a suspension system 120. The railcar 110 preferably comprises more than one wheelset, which guides the railcar 110 along a set of substantially parallel rails 170.

A support or mounting structure 150 mechanically attaches one or more conductive plates 160 (or magnets in the case of a linear synchronous motor) to the body 115 of the railcar 110. In one embodiment, the conductive plates comprise planar sheets of a conductive material of a suitable thickness to prevent warping or damage in response to electromagnetic forces, heat, and use in the field. In one embodiment, the conductive plates 160 comprise aluminum, and may further comprise an iron backing. Although other materials can be used as the conductive plate 160, aluminum is relatively inexpensive, readily available, and lightweight. The conductive plate 160 can be either permanently or temporarily fixed to the railcar or permanently attached to the underside of one or a plurality of "braking"/"helper" railcars coupled to a descending train to provide dynamic braking for slowing the train while charging embedded armature coils 180. In one embodiment, the conductive plates 160 are added at a first switchyard and removed at a second switchyard. e.g., on either side of a downhill stretch of track. Another aspect of the invention is adding one or a plurality of "braking"/"helper" railcars to a train consist prior to an uphill climb, using the one or a plurality of "braking"/"helper" railcars to assist the train consist up the uphill climb, and removing the one or a plurality of "braking"/"helper" railcars from the train consist after the uphill climb.

Armature coils 180, which, when energized by an energy source act as a source of magnetic flux, may be mounted along the middle of the track between the two rails 170. The armature coils 180 may be oriented such that the magnetic field of the armature coils is oriented axially along the track, that is that a line defined by the north pole and south pole of the magnetic field is substantially parallel to the track. The magnetic field of the armature coils 180 induces a magnetic field in the conductive plate 160. The armature coils 180 may be mounted within an optional housing 185 to protect the armature coils 180. The housing is preferably a suitably durable and non-magnetically reactive material, such as plastic.

The mounting structure 150 functions to maintain a narrow air gap between the conductive plate 160 and the armature coils 180 to minimize the reluctance of the magnetic path between the two. The mounting structure 150 may be adjustable to maintain the narrow airgap. The mounting structure 150 may further be automatically adjusted by a motor attached to a sensor and processor running appropriate software or hardware, such that a minimal gap distance is maintained. Alternatively, with the use of rollers or wheels of sufficient diameter, a constant gap distance may be maintained. As the conductive plate 160 passes over the armature coils 180, which may embedded in the railroad track, a voltage and current perturbation is generated in the wire of the armature coils 180 proportional to the speed of the passing car. The mounting structure 150 may comprise suitable fasteners and other support structures to mount the conductive plate 160 and/or coils 180 to the frame or other suitable structure of the railcar 310. Such fasteners and support structure may vary and, and may be customized for, particular models of the railcar 310.

The armature coils 180 may be configured to overlap in such a way that they can be connected in a standard "WYE" or "DELTA" configuration and can be thus be commutated by the power conditioning module 190 to operate as a three-phase AC electrical power connection. The commutation and power conditioning module 190 may includes phase switching elements such as insulated gate bipolar transistors (IGBT), which are configured to format the voltage and currents from the armature coils 180 so as to be compatible with the power grid requirements.

In the embodiment illustrated in FIG. 1, the armature 180 is electrically coupled to a power grid 195, thus any generated power from the commutation and power conditioning module 190 can be provided to the power grid. The commutation module 190 may further be configured to drawing power from the power grid, such as to energize the armature coils, or to provide accelerative motive force. The linear motor infrastructure to capture the braking energy can be used as linear motors to assist in the propulsion of freight trains traveling uphill. The uphill assistance of the linear motors is more efficient than using one or more diesel electric-powered locomotives to move a train uphill and can result in a significant savings of diesel fuel and associated exhaust emissions.

In one embodiment, multiple sections of armature coils 180 and power conditioning modules 190 are used along the track. Each section is activated when a railcar with a conductive plate 160 passes over the top of the armature coils 180. Thus, energy is supplied to the power grid 195 in successive sections as the train moves. When such power is fed to a power grid, additional equipment may be needed, such as power conditioning inverters located periodically along the track for formatting the power appropriate to a grid connection. When such power is to be stored, other equipment such as a battery may be needed.

Although the braking regeneration system 100 has thus been described as being used with a freight railcar, in alternative embodiments, the braking regeneration system 100 is applied to locomotives or other passive railcars such as, but not by way of limitation, commuter car, flat car, tank car, box car, bulk material car, fuel car, container car, and caboose. Further, although the braking regeneration system 100 may at times be described as being used with a single passive individual railcar 110, in alternative embodiments, an underside-mounted braking regeneration conductive plate 160 (and/or magnet) is applied to an entire train of (or linked series of) passive railcars often referred to as a "consist."

The braking regeneration system 100 will now be described during deceleration and acceleration of the consist. On deceleration, the linear generator action between the armature 180 and the conductive plate 160 (and/or magnets in the case of a linear synchronous motor) puts a drag on the body 115 of the railcar 110 to slow down the railcar 110. System controls prevent the railcars 110 from abruptly compressing and extending the couplers. The individual railcars 110 may have their systems activated in an in-line or series configuration, one at a time, to prevent lurching. The independent control system may be transparent to the remainder of the consist or may operate as an integrated control system with other cars of the consist. Below a minimum speed, for example 3 mph, the braking regeneration system may be turned off and a standard friction brake system applied to stop the train.

For example, because the kinetic energy has been recovered and thus diverted from the generation of heat and wear in the brake system, the brake wear and corresponding maintenance for the brake system is reduced. Similarly, wear on the track can also be reduced. The railcar 110 decelerates by capturing energy on deceleration, while reducing the burden on the braking system. Freight train braking energy from downhill grades is therefore recycled to the power grid 195 and the power grid 195 may offer an assist to the propulsion of freight trains traveling uphill.

As discussed above, embodiments of the invention, such as the braking regeneration system 100 illustrated in FIG. 1, may be useful in slowing the descent of railcars on a downhill grade by converting the kinetic energy of the railcar into electrical energy. By way of example, but not limitation, one typical railroad grade extends from San Bernardino, Calif. (elevation 1118 feet) up the Cajon Pass Summit (elevation 3855 feet), for an elevation change of 2735 feet, and back down to the switch yard at Barstow, Calif. (elevation 2163 feet). The 2735 foot elevation descent from the summit to the switch yard at San Bernardino represents about 15,450 kWh of energy for a freight train of 15 million pounds, where 1 foot-pound=$3.766\times10^{-7}$ kWh and, 15,000,000 pounds×2735 feet=15,450 kWh. Therefore, a single descending freight train has enough energy to power about 30 homes for a month.

Assuming that 50% of the energy is recoverable from dynamic braking regeneration capture and recycling, every downhill traveling freight train provides 7,725 kWh of useable energy, or enough power for 15 homes for a month. The 40 to 60 trains per day that descend the Cajon Pass could potentially provide 309,000 kWh to 463,500 kWh of energy to the electric power grid every day. At 8 cents per kWh of clean energy the value is $24,720 to $37,080 per day or about $10.6 million per year. This is the size of a small power station that could provide enough power for over 20,000 homes. At this rate, an installation cost of $3 million per mile over the 18 mile descent would be paid off over five years. The payback time could be shorter because the number of trains going down the pass is expected to double over the next ten years. The power is added to the grid as each train travels down the track much like a wind farm that adds power to the grid when the wind is blowing.

Figure 2:
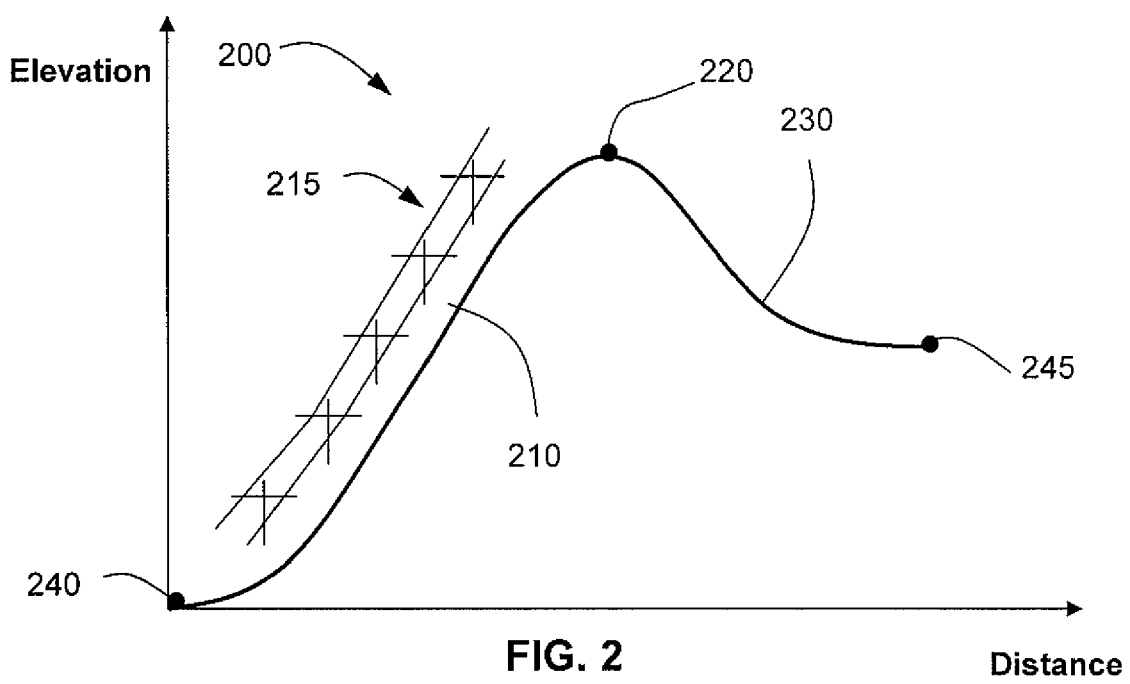
FIG. 2 is a graph of an exemplary railroad elevation grade profile with a summit pass.

FIG. 2 shows an exemplary railroad pass. In one embodiment of the invention, there is provided a system 200 in which freight train braking energy from the downhill grade 210 is recycled to an electric grid power line 215 located alongside the downhill track 210. Similarly, freight train braking energy from the downhill grade 230 past the summit 220 may be recycled to another electric grid power line (not shown) located along the opposite downhill track 230. The system 200 may be implemented with linear motor technology or present electric train technology such as EMU commuter cars or electrically driven locomotives that use catenary and third rail connections. In one embodiment, a suitable linear induction electric motor is disclosed in further detail in U.S. Patent Publication No. 2006/0113848, which is hereby incorporated by reference in its entirety. In present electric train technology, additional power cars are often added and removed from passing trains at upper and lower rail switch yards 240, 245.

In one embodiment, a system captures braking energy where the fixed and moving elements are reversed, e.g., the conducting aluminum plate is mounted between the rails and the armature coils and magnet are mounted on the underside of the railcar.

Figure 3:
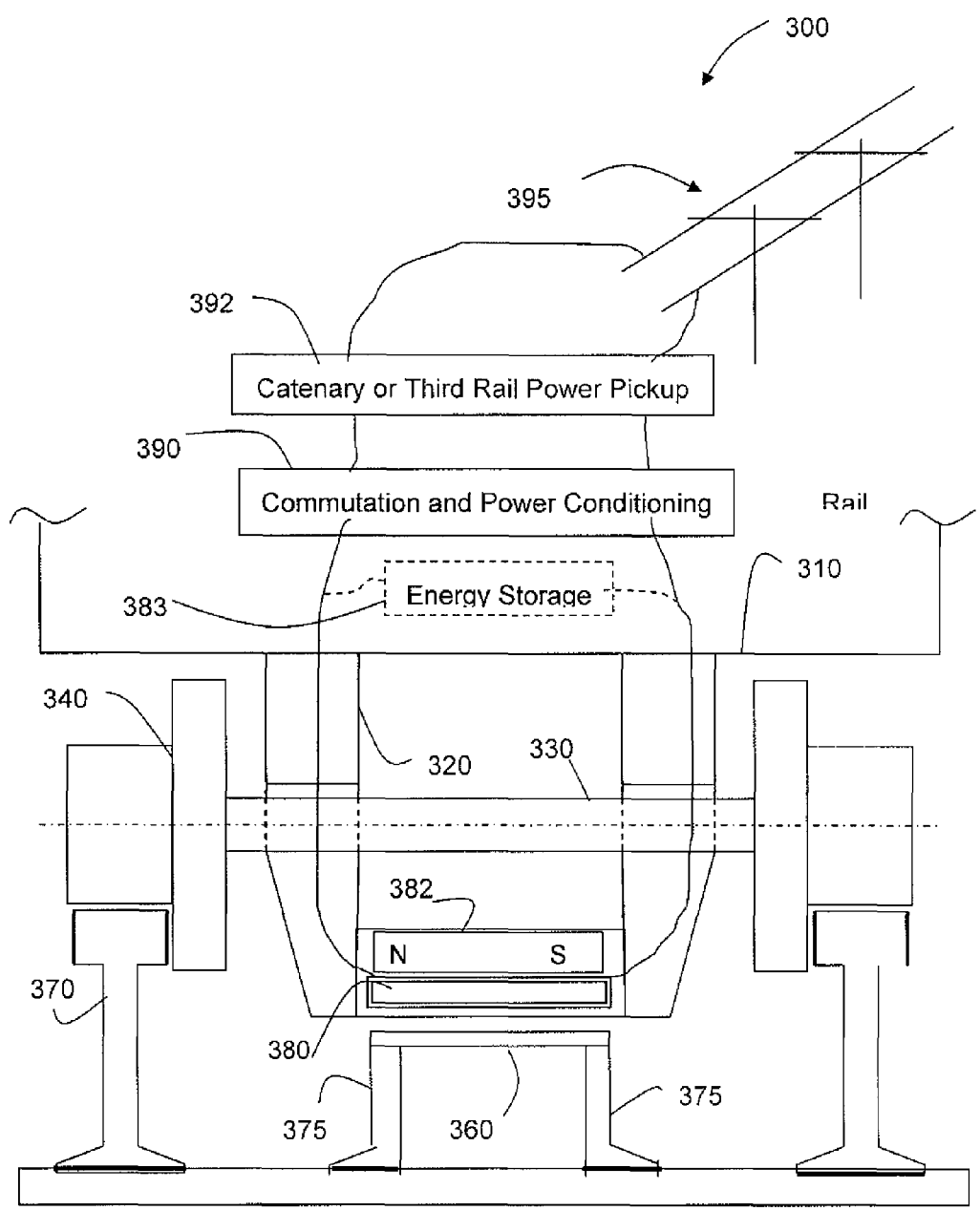
FIG. 3 is an illustration depicting another embodiment of a braking regeneration system for a passive railcar with a third rail or catenary power pickup.

FIG. 3 illustrates an embodiment of an example system 300 that also uses a linear motor. Similar to the embodiment described with respect to FIG. 1, the railcar 310 rides on a wheel 320, axle 330, and suspension 320 support system. Armature coils 360 and a magnet 382 are mounted on the railcar 310 and a conductive plate 360 with optional mounting structure 375 is located on the track between the rails 370. The armature coils 380 and magnet 382 may be added at a first switchyard and removed at a second switchyard, e.g., on either side of a downhill stretch of track.

Just as with other embodiments, an advantage of using a linear motor is that the propulsion braking and the propulsion acceleration do not depend on the static friction between the wheel 320 and the rail 370, yet maintains the low rolling friction offered by that support. A power conditioning module 390 and a catenary or third rail power pickup 392 provides the connection to the power grid 395.

The railcar 310 also comprises a mounting and connection to either an overhead catenary or a third rail via an catenary or third rail power pickup 392. These energy capture railcars supply the energy to a power grid 395 through an overhead catenary or a third rail. Alternatively, these motor and energy storage cars can be connected to a train consist to assist an uphill climb by using the linear motor of the car to push against the conducting plate 380 fixed in the middle of the track. The motor and energy storage car would be removed at the top of the grade and then connected to another passing train that is traveling down the grade descent.

In a further aspect of the invention, an optional energy storage pack 383 is used on the vehicle or at specified points on the ground. The energy storage pack may, for example, smooth out the power spikes that occur between electrical power nodes. Examples of suitable devices for energy storage include ultracapacitors, flywheels, and batteries.

With reference to FIG. 1, the advantage of using the linear motor technology is that the enclosed armature 180 and magnet 182 in the middle of the track rails 170 does not present the exposed electrical safety hazard of a catenary or third rail. Also, the conductive plate 160 is generally easier to add to railcars than using dedicated electrically powered prime mover railcars that are attached and removed form a freight train consist at the upper and lower rail yards. However, both disclosed embodiments fall within the scope of the invention, as do further variations such as those described below.

Of course, the location of the conducting plates or armature coils is not limited to the underside of the locomotive or passive railcars. For example, in another embodiment of the invention, conductive plates are mounted on the sides of a railcar, which passes stations on the sides of the track housing armature coils connected to a power grid. It is to be recognized that while some embodiments are described with respect to linear induction motors, other embodiments may comprise linear synchronous motors. Additionally, although in one embodiment, a train consist may draw on energy of downhill grades, a train consist may pick up an excess speed going downhill and need further braking on a flat or even uphill track, to which this invention is also understood to apply. The deceleration capability of the linear motor offers a closely spaced movement of successive downhill traveling trains without increasing the safety risk of a runaway train.

While the above detailed description has shown, described, and pointed out novel features of the invention as applied to various aspects, it will be understood that various omissions, substitutions, and changes in the form and details of the device or process illustrated may be made by those skilled in the art without departing from the scope of this disclosure. As will be recognized, the invention may be embodied within a form that does not provide all of the features and benefits set forth herein, as some features may be used or practiced separately from others. The scope of this disclosure is defined by the appended claims, the foregoing description, or both. All changes which come within the meaning and range of equivalency of the claims are to be embraced within their scope.

What is claimed is:

1. A method of configuring a rail system to generate electrical power, comprising:

positioning a source of magnetic flux so as to induce a magnetic field in a first conductor;

positioning a second conductor substantially stationary relative to the source of magnetic flux, so as to generate an electric current in response to a relative motion of the first and second conductors;

electrically coupling the second conductor to a power line of an electric power transmission system so as to supply energy to the power transmission system during the downhill travel of a rail car;

attaching the first conductor to the underside of a railcar at a first switch yard to decelerate the rail car downhill; and removing the first conductor from the underside of the railcar at a second switch yard.

2. The method of claim 1, further comprising supplying electric power to the second conductor to assist in the uphill propulsion of the rail car.

3. The method of claim 2, wherein the first or second conductor is attached to the rail car at a first switch yard to assist the rail car uphill and removed from the rail car at a second switch yard.

4. A method of configuring a rail system to generate electrical power, comprising:

positioning a source of magnetic flux so as to induce a magnetic field in a first conductor;

positioning a second conductor substantially stationary relative to the source of magnetic flux, so as to generate an electric current in response to a relative motion of the first and second conductors;

electrically coupling the second conductor to a power line of an electric power transmission system so as to supply energy to the power transmission system during the downhill travel of a rail car; and using one or more linear electric motor cars to assist a train up an uphill climb, the train having one or more dual-mode locomotives for primary propulsion power.

5. The method of claim 4, further comprising adding the one or more linear electric motor cars to the train prior to traversing an incline and removing the one or more linear electric motor cars from the train subsequent to the traversing.

6. The method of claim 4, further comprising generating power using the one or more linear electric motor cars while traversing a decline so as to brake the rail car.

7. The method of claim 4, wherein electrically coupling the second conductor to a power line of a power transmission system comprises electrically coupling the coil to at least one of a catenary and a third rail.

8. The method of claim 4, further comprising connecting an energy storage device to the second conductor so as to store energy generated during the downhill travel of the rail car.

* * * * *